Jan. 1, 1952     T. T. GRAHAM     2,581,015
REPAIR CLAMP FOR PIPE LINES
Filed March 4, 1946
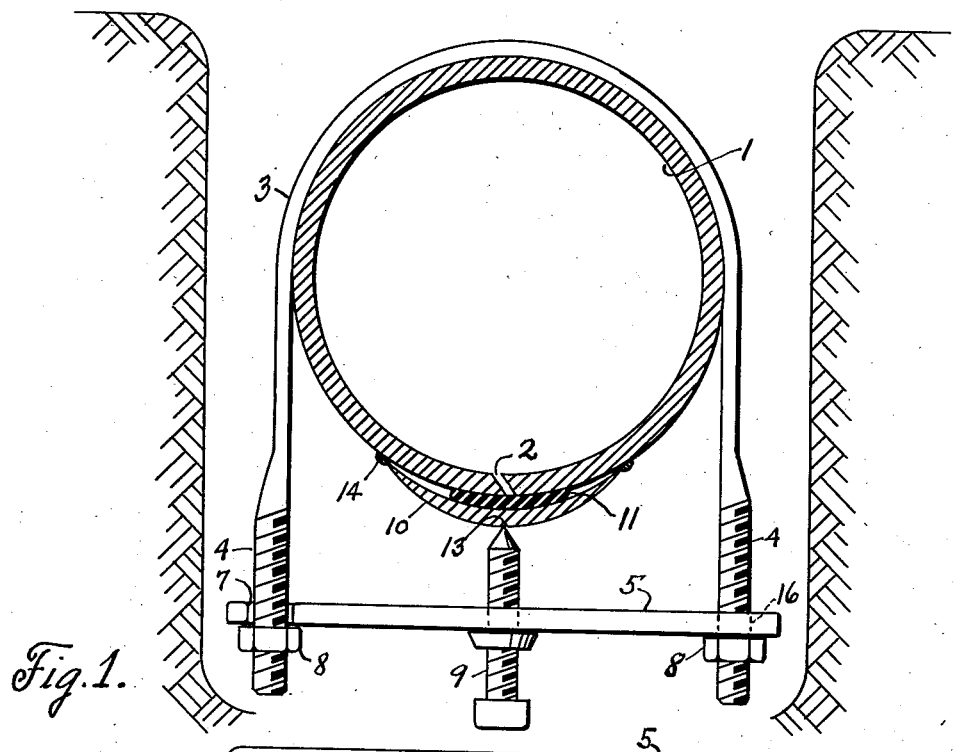
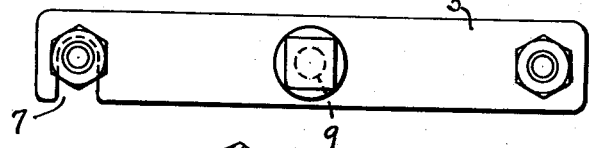
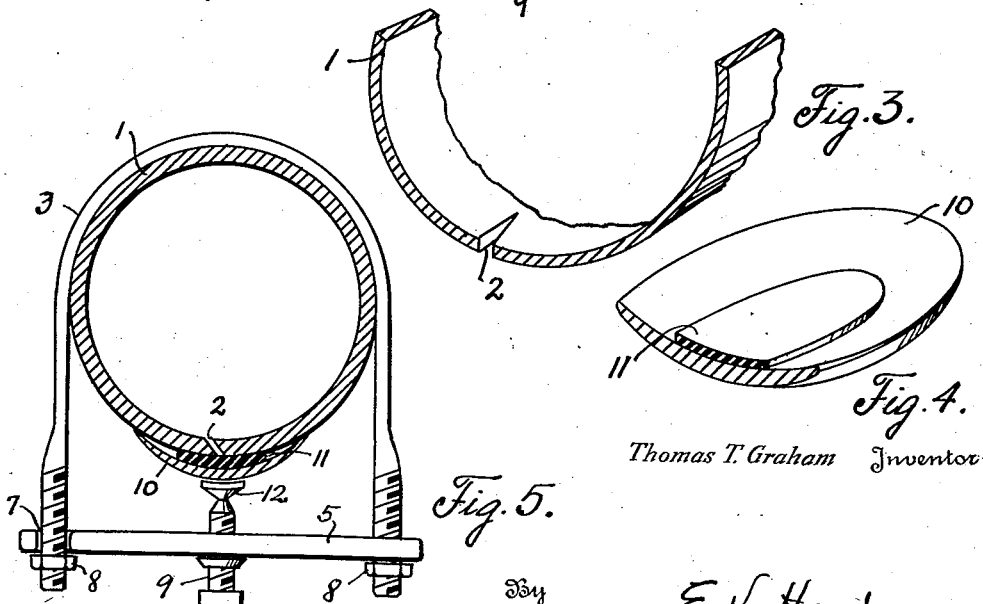
Thomas T. Graham, Inventor
By E. V. Hardway, Attorney Patented Jan. 1, 1952

2,581,015

UNITED STATES PATENT OFFICE 2,581,015

REPAIR CLAMP FOR PIPE LINES

Thomas T. Graham, Houston, Tex.

Application March 4, 1946, Serial No. 651,881

2 Claims. (Cl. 138—99)

This invention relates to a repair clamp for pipe lines.

An object of the invention is to provide apparatus for repairing leaks in pipe lines particularly lines which are buried under ground.

Another object of the invention is to provide apparatus for repairing pin holes, cracks or other fissures in a pipe line for conducting fluid while the line is still in operation.

It is a further feature of the invention to provide, in apparatus of the type described, a novel type of patch employed.

Other objects and advantages of the invention will be apparent from the following specification which is illustrated by the accompanying drawings, wherein:

Figure 1 is a side view of the clamp as applied to a pipe line in a trench in the earth showing the patch in section.

Figure 2 is a bottom view thereof.

Figure 3 is a fragmentary, sectional, view of a section of pipe showing a crack therein.

Figure 4 is a sectional, perspective view of the patch employed; and,

Figure 5 is an elevational view of a slightly modified form of the clamp showing the patch in section.

Referring now more particularly to the drawings wherein like numerals of reference designate the same parts in each of the figures, the numeral 1 designates the pipe line to be repaired having a fissure 2 to be patched.

The numeral 3 designates a U-shaped yoke formed of a flat band whose arms terminate in the outwardly threaded cylindrical portions 4, 4.

The numeral 5 designates a tension bar, one end of which is formed with an opening 6 to receive one of the arms 4 and whose other end is formed with a transverse slot 7 to receive the other arm 4.

There are the nuts 8, 8 which are threaded onto the outwardly threaded portions of the arms 4 and which retain the tension bar 5 in place.

There is a tension screw 9 which is threaded centrally through the bar 5 and whose inner end may be pointed, as shown in Figure 1.

The numeral 10 designates a metal patch to be applied over the crack 2. It is shaped to conform approximately to the contour of the pipe, and is of an elliptical shape and terminates in thin edges. It is concavo-convex in general contour, and slightly flexible.

The patch 10 is fitted to the pipe with its concave side toward the pipe and between the patch and the pipe there is a pad 11 of resilient material such as rubber.

In the form illustrated in Figure 5 there is a bearing cap 12 which has a swivelling connection with the inner end of the tension screw 9.

In application the yoke 3 is applied to the pipe and the tension bar 5 is then swung around until the corresponding arm 4 is seated in the slot 7, as shown in Figure 2.

During this operation the tension screw 9 is backed off or unscrewed the required distance and the patch 10 with the pad 11 therein are then applied to the pipe with the pad over the crack 2 to be repaired. The tension screw 9 may then be screwed inwardly until the inner end of the screw 9 or the bearing cap 12, as the case may be come into contact with the patch 10 and said screw may be further turned up to force the pad 11 into the crack and to force the margins of the patch 10 into close contact with the pipe. The patch 10 is sufficiently flexible so that upon the application of said pressure its margins will form a continuous contact with the pipe, out beyond the margins of the pad 11.

As shown in Figure 1, the patch may have an external depression 13 to receive the pointed end of the screw to maintain the patch centered relative to the crack 2.

The margins of the patch 10 may then be welded to the pipe, as by electric welding, as indicated at 14, Figure 1, and the clamp maintained in place until the weld has cooled and thereafter it may be unloosened, in an obvious manner and withdrawn from the pipe.

For temporary repairs the clamp may be left in place, in which case the welding will not be necessary.

The drawings and description are illustrative merely while the broad principle of the invention will be defined by the appended claims.

What I claim is:

1. A repair clamp for pipe lines comprising, a yoke shaped to surround a pipe and having side arms which terminate in outwardly threaded portions, a tension bar having an opening in one end to receive one of said arms and having a side slot at its other end to receive the other arm, retaining nuts on said arms to retain said bar, a tension screw threaded through said bar, a flexible concavo-convex metallic patch terminating in thin edges and against whose convex side the screw is arranged to operate to hold said edges in engagement with the pipe in position to be welded to the pipe to form a pocket between the pipe and the concave side of the patch and a resilient pad in the pocket on the concave side of the patch.

2. A repair clamp for pipe lines comprising, a yoke shaped to surround a pipe and having side arms which terminate in externally threaded portions, a tension bar, one end of which is provided with an opening to receive one of said arms, said bar having a side slot at its other end to receive the other arm, retaining nuts on said arms to retain said bar, a tension screw threaded through said bar, a flexible concavo-convex metallic patch which tapers to a thin edge all the way around and against whose convex side the screw is arranged to operate to hold said edge in engagement with the pipe in position to be welded to the pipe to form a closed pocket between the pipe and the patch and a resilient pad in the pocket on the concave side of the patch whose margins are spaced inwardly from the margins of the patch a sufficient distance to provide sufficient metal beyond the margins of the pad to permit welding of the margins of the patch to the pipe.

THOMAS T. GRAHAM.

REFERENCES CITED

The following references are of record in the file of this patent:

UNITED STATES PATENTS

| Number | Name | Date |
|---|---|---|
| 216,639 | Allaire | June 17, 1879 |
| 613,179 | Rucker | Aug. 15, 1899 |
| 1,460,224 | Blair | June 26, 1923 |
| 1,475,487 | Hammond | Nov. 27, 1923 |
| 2,199,552 | Watson | May 7, 1940 |
| 2,279,642 | Schreiner | Apr. 14, 1942 |

FOREIGN PATENTS

| Number | Country | Date |
|---|---|---|
| 499,145 | Germany | May 30, 1930 |